Figure 1:
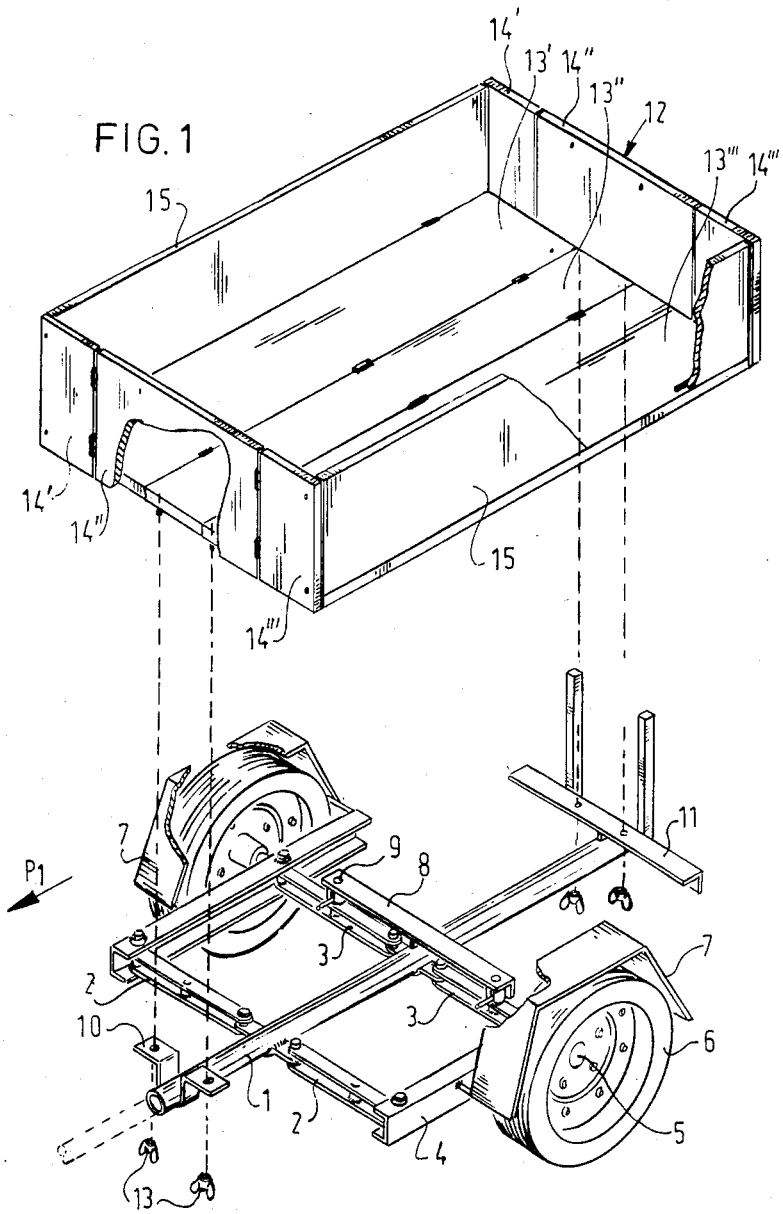

United States Patent [19]

van der Wouden

[11] Patent Number: 4,671,530
[45] Date of Patent: Jun. 9, 1987

[54] COLLAPSIBLE FREIGHT CAR

[75] Inventor: Adriaan van der Wouden, Zundert, Netherlands

[73] Assignee: Bussink Engineering B.V., Varsseveld, Netherlands

[21] Appl. No.: 566,988

[22] Filed: Dec. 30, 1983

[30] Foreign Application Priority Data

Dec. 31, 1982 [NL] Netherlands ............... 8205085

[51] Int. Cl.⁴ .............................. B62B 1/04
[52] U.S. Cl. .................... 280/656; 280/652
[58] Field of Search ........... 280/656, 646, 645, 38, 280/652

[56] References Cited

U.S. PATENT DOCUMENTS

| | | | |
|---|---|---|---|
| 1,982,935 | 12/1934 | Stuugaard | 280/42 |
| 3,623,744 | 11/1971 | Bertmans | 280/106 |
| 3,913,934 | 10/1975 | Koehn | 280/34 A |
| 3,979,133 | 9/1976 | Morris | 280/42 |
| 4,243,242 | 1/1981 | Wuits | 280/656 |
| 4,301,873 | 11/1981 | Baxter | 280/656 |
| 4,372,568 | 2/1983 | Campbell | 280/656 |

FOREIGN PATENT DOCUMENTS

| | | | |
|---|---|---|---|
| 0008931 | 3/1980 | European Pat. Off. | |
| 2050658 | 4/1971 | France | |
| 1361874 | 7/1974 | United Kingdom | 280/656 |

Primary Examiner—John J. Love
Assistant Examiner—Eric D. Culbreth
Attorney, Agent, or Firm—John P. Snyder

[57] ABSTRACT

A collapsible, drawn freight car having a central longitudinal girder is disclosed. The central girder has a towing connection at its forward end and side girders pivotally connected to each side by pivotal arms. A transverse beam is fixed to the center girder and has lock bolts for engaging and locking the pivotal arms in a transport position.

17 Claims, 11 Drawing Figures

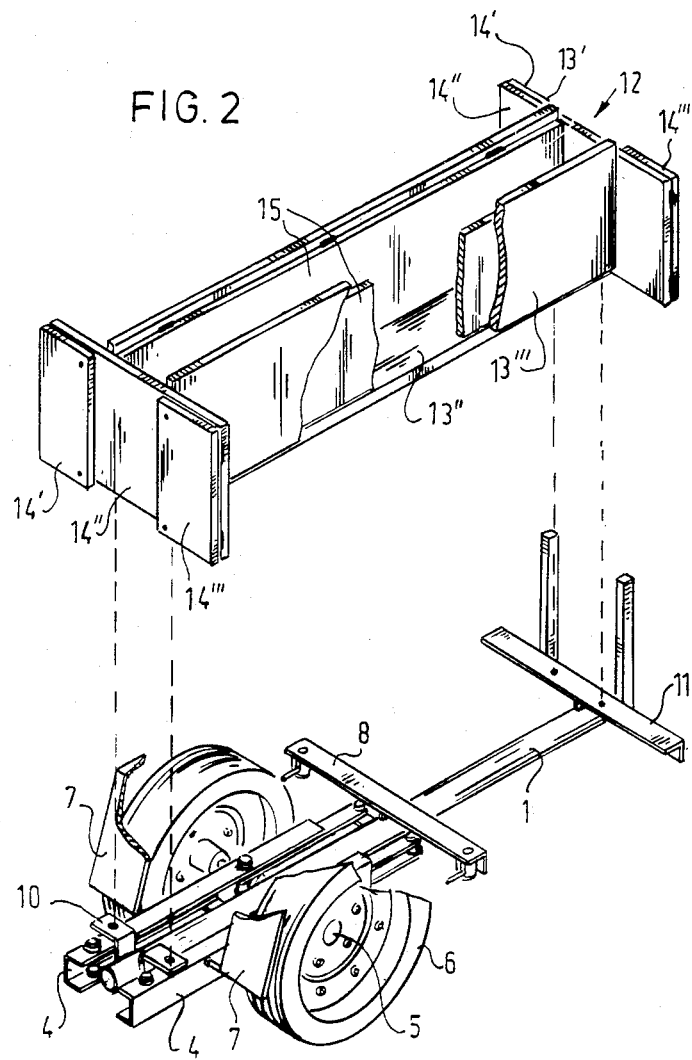

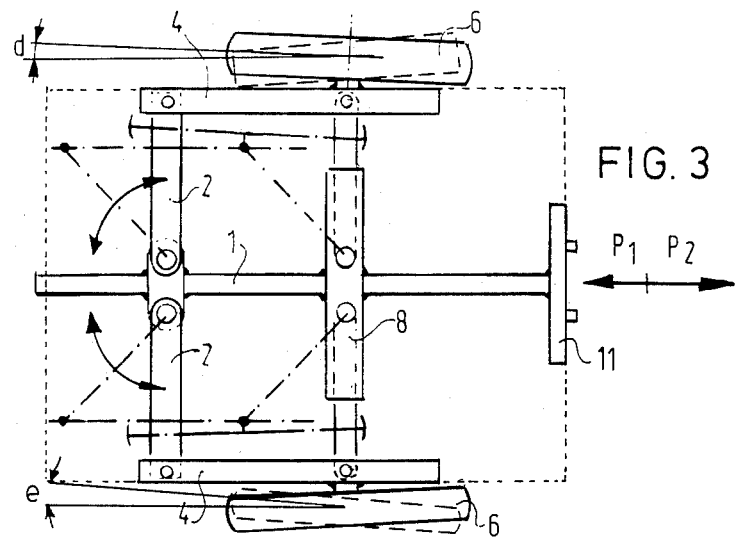
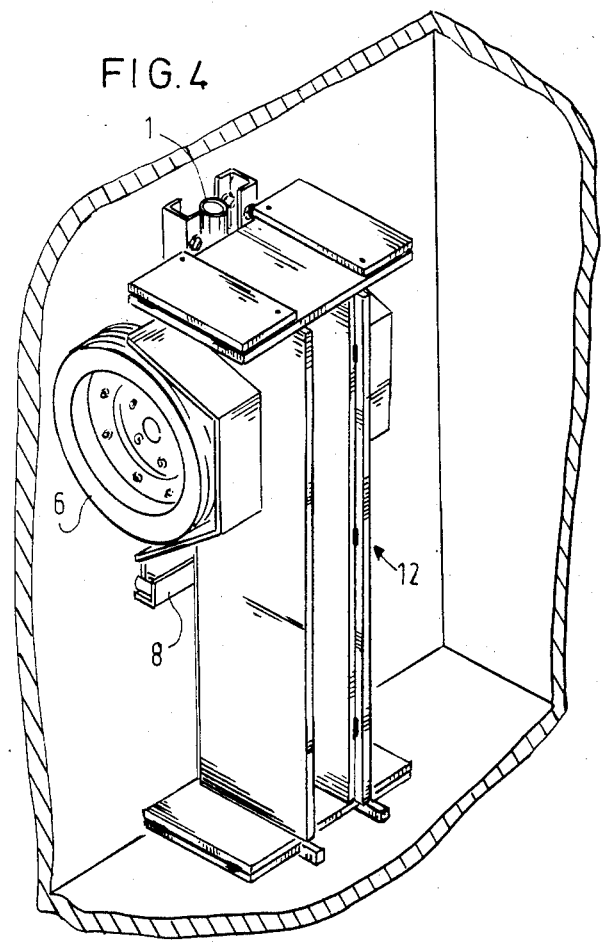

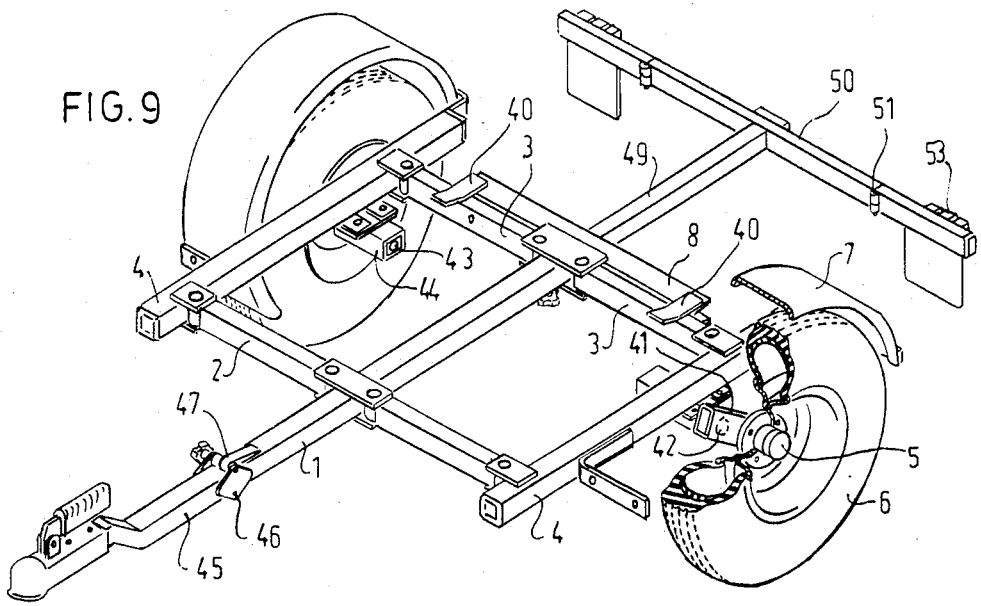
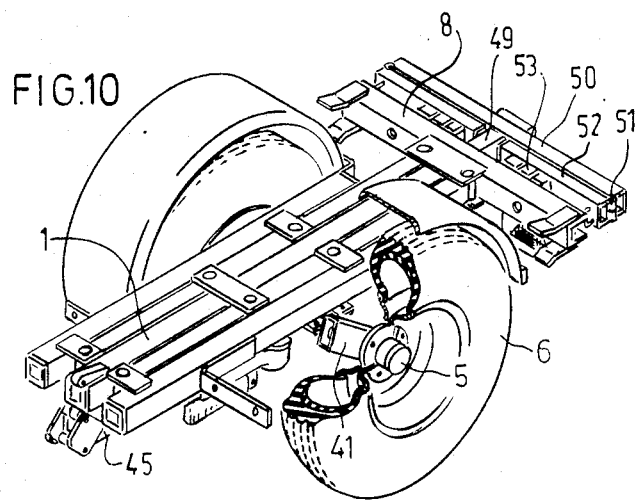
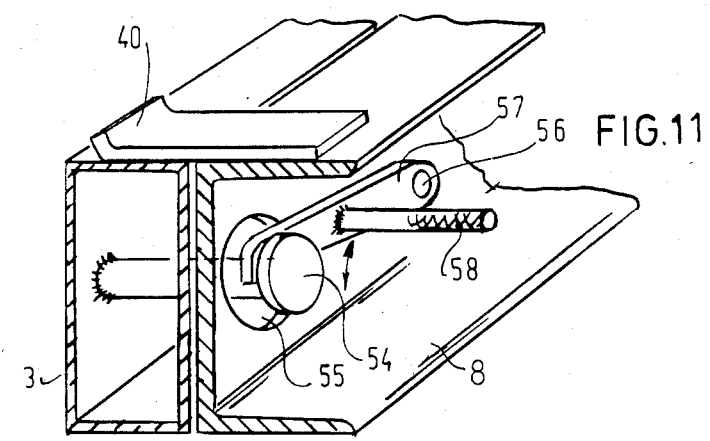

COLLAPSIBLE FREIGHT CAR

The invention relates to a collapsible, drawn freight car mainly comprising a central longitudinal girder, two side girders arranged one on each side of the former and being displaceable each through at least two pivotal arms parallel or substantially parallel to said longitudinal girder and a ground wheel carried by each side girder.

A freight car of the kind set forth in the preamble is known in many designs and it is mainly used for transporting holiday luggage, surf boards, bicycles or similar loads. In order to permit of storing the freight car out of use without requiring much space, the freight car is collapsible. However, the known freight cars have the inconvenience that this requires rather many manipulations, whilst the cars comprise complicated folding structures.

The invention has for its object to improve said freight car by means of a particularly simple structural design ensuring simple maniability.

The freight car embodying the invention is distinguished in that the longitudinal girder is provided with a fixed transverse beam supporting a pivotal arm in the transport position of the car.

By using the fixed transverse beam the pivotal arm construction can be particularly light because the fixed transverse beam together with the central longitudinal girder absorbs the load forces. However, the fixed transverse beam need have only a small length, with corresponds to the width of the folded car.

Preferably the transverse beam is furthermore provided with locking means to lock the arm to the transverse beam.

In a further development the wheel suspension is arranged near a pivotal arm on the side girder, the transverse beam supporting the pivotal arm. In this embodiment the forces are transferred from the longitudinal girder through the transverse beam substantially directly to the wheels so that the hinge construction can even be lighter.

In order to facilitate folding and unfolding of the car all pivot shafts of the pivotal arms are vertically directed, whilst the wheels are set in or out of track. After unlocking the pivotal arm from the transverse beam, as the case may be, the user need only move the car forwards or backwards to cause the wheels to move in the direction of the central longitudinal beam and conversely. The stability of the car is nevertheless maintained so that rolling the car in the folded state remains possible, which enhances the maniability.

The above-mentioned and further features will be described more fully hereinafter with reference to a few embodiments shown in the Figures.

Figure 5:
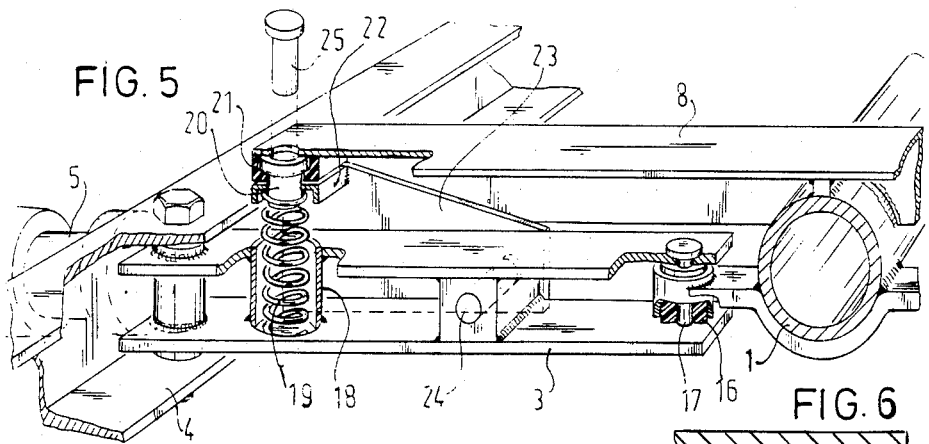
Figure 6:
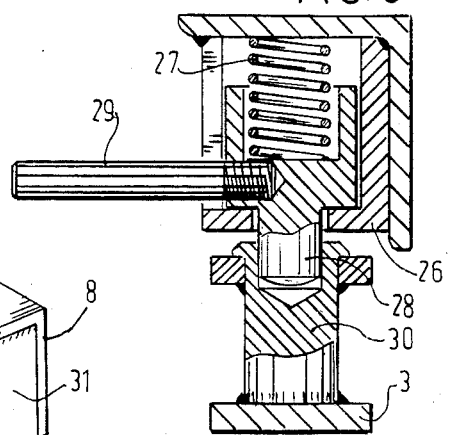
Figure 7:
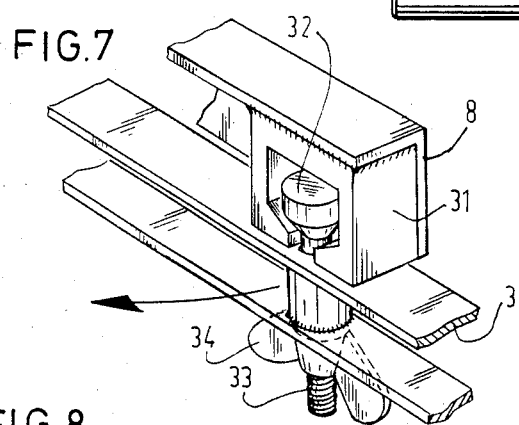
Figure 8:
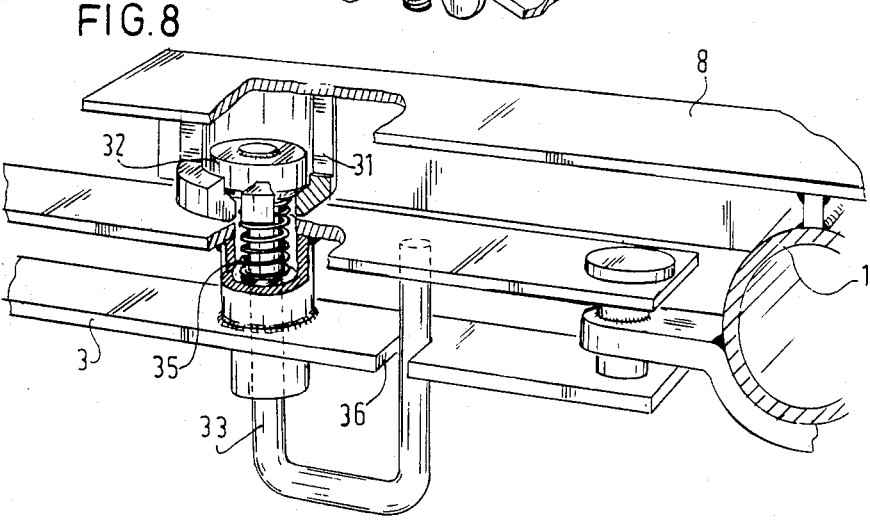

The drawing shows in:

FIG. 1 is a perspective view of a first embodiment of the freight car on which a box pellet can be placed, FIG. 2 is a perspective view of the freight car of FIG. 1 in the folded state, FIG. 3 is a schematic plan view of the freight car, illustrating the folding operation, FIG. 4 is the freight car in the collapsed state in a storing space, FIG. 5 is a perspective view of part of the freight car with a spring-supported pivotal arm, FIG. 6 is a cross-sectional view of a first embodiment of locking means, FIG. 7 and FIG. 8 are each variant of locking means in a perspective view, FIGS. 9 and 10 are each perspective plan view of a second embodiment of the freight car, FIG. 11 is a perspective view of the locking means used in the embodiment of FIG. 9.

Corresponding parts of the embodiments shown in all Figures are designated by the same reference numerals.

Referring to FIG. 1 reference numeral 1 designates the central longitudinal girder on both sides of which is arranged a pair of foremost pivotal arms and of hindmost pivotal arms 2 and 3 respectively, viewed in the direction of movement. With the ends of the pivotal arms 2 and 3 is coupled a side girder 4, to which a stub shaft 5 of a ground wheel is fastened. On the top side of the ground wheel is mounted a wheel screen 7 known per se, which is fastened also to the side girder 4 in the embodiment shown in FIG. 1.

Above the hindmost pivotal arms 3 a transverse beam 8 is rigidly secured to the longitudinal girder 1, said beam extending along substantially half the length of each pivotal arm 3. Near the end of the transverse beam 8 locking means 9 are provided for holding the pivotal arms in the out-position.

The longitudinal girder 1 is provided at the front with a bracket 10 and at the rear with a second transverse beam 11 for fixing the box pellet 12 by means of bolts and wing nuts 13.

The pellet 12 comprises a bottom platform formed by three strips 13', 13" and 13"', a front and rear partition consisting of three parts 14', 14" and 14"' and two longitudinal plates 15. The strips, parts and plates are pivotally interconnected so that the trough 12 can be folded.

The folding operation is further explained with reference to FIGS. 1 and 2.

Starting from the mounted transport position in which the trough 12 is fastened to the frame the following steps have to be carried out:

The wing nuts 13 are loosened, after which the trough 12 can be removed. Folding is carried out by tilting the side plates 15 inwardly to the bottom platform 13, whilst the strips 13' and 13"' can be tilted up. Subsequently the parts 14' and 14"' are tilted to the outer side of the central part 14" so that the state shown in FIG. 2 is obtained.

Subsequently the lock bolts 9 are loosened, after which the wheels can be displaced in the direction of the longitudinal beam 1 by sliding the side girders 4 in the direction of the arrow P1 forwardly around the pivotal arms 2, 3. In this way the state shown in FIG. 2 is reached; it will be apparent that the transverse beam 8 does not extend beyond the width of the collapsed car. This also applies to the additional transverse girder 11.

The two parts can then be placed in a position shown in FIG. 9 against the wall of a room, where the car occupies very little space.

For restoring the transport position the manipulations described above are carried out in the reverse order. The required rigidity of the frame for absorbing the loading forces is obtained owing to the use of the transverse beam 8 by which the forces can be transferred substantially directly to the wheels. The hinges of the pivotal arms 3 are appreciably relieved by the construction shown so that they may be relatively simple. The hinges of the pivotal arms 2 only serve for guiding and hardly contribute to the load distribution because the stub shafts 5 are arranged near the hindmost pivotal arms 3 on the side girders 4.

FIG. 3 illustrates that folding and unfolding the car can be facilitated by causing the wheels 6 to be out of track by d. When moving to and fro in the direction of the arrow P1 (forwards) and of the arrow P2 (backwards) respectively, the wheels 6 will generate such a resistance that they push from the side girders 4 in the desired direction, that is to say, from the central girder 1 and towards the girder respectively. It is noted that the wheels may be as well be an inward track as illustrated in dotted lines in FIG. 3 wherein the wheels are out of track by an angle e. The angles d and e are shown in the drawing on an exaggerated large scale for the sake of clarity.

The required spring action of the longitudinal girder and the transverse beam 8 with respect to the wheels 6 can be obtained in many ways. One of them is shown in FIG. 5, in which the hinge between the arm 3 and the longitudinal girder 1 is constructed in the form of a pivot pin 17 embedded in a rubber lining 16 so that apart from the rotary movement shown in FIG. 3 an upward and downward movement of the pivotal arm 3 in a vertical plane becomes possible. Near the end of the transverse beam 8 a sleeve 18 is included in the pivotal arm 3 in which a helical spring 19 is arranged. The helical spring is held at the top by a sleeve 20 around the shaft, about which fits the upper turn of the helical spring 19. The sleeve 20 is fixed in a rubber block 21, which bears on a support 22 of a plate 23 which is pivotally arranged at the pivot pin 24 in the pivotal arm 3.

When the side girder 4 is swung out, the pivotal arm 3 will turn outwards into the position shown in FIG. 5 so that the rubber block 21 gets below the upper flange of the transverse beam 8. This position can be locked by inserting a lock bolt 25 into the sleeve 21 through a hole in the upper flange.

A spring action of the pivotal arm 3 with respect to the fixed transverse beam 8 is possible owing to the helical spring 19, since the arm 3 can turn up and down at the hinge 17.

When the wheels 6 are spring-controlled relatively to the side girder 4, the locking means can be simpler, since the pivotal arm 3 can be immovable with respect to the transverse beam 8.

Such locking means are shown in FIGS. 6, 7 and 8.

FIG. 6 shows a transverse beam 8 provided on the underside with a housing 26 accommodating a locking pin 28 loaded by a spring 27. The locking pin is upwardly movable against the action of the compression spring 27 by means of a handle 29. The pivotal arm 3 is provided with a sleeve 30 into which the lock bolt 28 can snap as soon as the pivotal arm 3 has turned below the fixed transverse beam 8.

FIG. 7 shows a transverse beam 8 with which a housing 31 is rigidly connected for receiving the head 32 of a lock bolt. The bolt has screwthread 33 on the lower side, onto which a wing nut 34 can be screwed. The bolt is slidably arranged in the pivotal arm 3. It will be obvious that by tightening the wing nut 34, the bolt is drawn down so that the head 32 is clamped in the housing 31, as a result of which locking between the pivotal arm 3 and the fixed transverse beam 8 is ensured.

FIG. 8 shows an embodiment the operation of which corresponds with that of the embodiment of FIG. 7, but the head 32 of the lock bolt is permanently drawn downwards by a draw spring 35 included in the pivotal arm 3. The lower end of the lock bolt 33 is twice bent over at right angles so that the upwardly extending free end of the bolt 33 snaps into a slot 36 of the lower flange of the pivotal arm 3.

The head face bears on the bottom face of the upper flange. Unlocking is possible by turning the upwardly extending end of the bolt out of the slot 36, by subsequently pushing the bolt 33 upwards so that the head is released from the housing 31 of the fixed transverse beam 8.

FIGS. 9 and 10 show a second embodiment which is distinguished from the foregoing embodiments mainly in that the pivotal arm 3 is not arranged below but in front of the fixed transverse beam 8. As a result the overall structural height is reduced. The pivotal arms 3 are supported by the tags 40 welded to the transverse beam 8.

The spring action is obtained in this case by fastening the stub shaft 5 to a reaction arm 41, which is provided with a pivot pin 42 included in a block 43 of elastic material. The block fits in a square sleeve 44, which is fastened to the underside of a side girder 4. During an upward and downward movement of the wheels 6 the block 43 will deform and ensure the desired spring action.

The central longitudinal girder 1 is provided at the front with a drawbar 45, which can be turned over by means of a hinge 46 to below the longitudinal girder 1. In the position of draught shown in FIG. 9 locking is obtained by means of a manually actuated lock bolt 47.

On the rear side the central girder 1 is provided with a part 49, which is slidable therein and which is fastened by the rear end to a transverse beam 50. The end of the transverse beam 50 has end parts 52 adapted to turn about hinges 51 and having a light system 53 fastened to them. Before tilting up the trough the end parts 52 are turned inwards so that the lights 53 are facing the transverse beam 8, which provides a protection in the folded state (see FIG. 10). By sliding the part 49 into the longitudinal girder 1 and by tilting up the drawbar 45 the overall length of the car in this embodiment is considerably reduced.

The car can be folded and used in the same manner as the embodiment of FIGS. 1 and 2.

FIG. 11 shows a potential lock bolt form for locking the pivotal arm 3 to the fixed transverse beam 8 of FIG. 9. For this purpose the pivotal arm 3 is provided with a pin 54 protruding in the direction towards the beam and having a thickened head. This head can be passed through a continuous hole 55 in the transverse beam. On the side remote from the arm 3 the transverse beam 8 is provided with a lock bolt 57 adapted to turn up and down about a shaft 56 and to be actuated by a handle 58. By passing the bolt 54 through the hole 55 in the transverse beam 8 and by moving the lock bolt 57 to the thickened head the locked position is obtained.

The invention is not limited to the embodiments described above. For example, within the scope of the invention the pivotal shafts of the pivotal arms 2, 3 may also be arranged in the horizontal plane so that the longitudinal girder 1 can be moved upwards with respect to the wheels 6. Also in this way the width of the car can be reduced. In this embodiment the advantage of the supporting mode for the transverse beam 8 in the transport position is maintained.

I claim:

1. A collapsible, drawn freight car comprising a central longitudinal girder having a towing connection at its forward end, two side girders arranged each on one side of the girder and being each displaceable through at least two pivotal arms extending from said girder to a respective side girder so as to move parallel or substantially parallel to the longitudinal girder between a trailing position with relation to said forward end of the girder at which said side girders are widely spaced and a forwardly shifted position with relation to said forward end of the girder at which said side girders are closely spaced, a ground wheel carried by each side girder, and a transverse beam rigidly fixed to the longitudinal girder and which can be fastened to a pivotal arm in the transport position of the car, the transverse beam being arranged behind and adjacent the hindmost arm of each of said at least two arms, said transverse beam and said hindmost arms having interengaging means directly engaging one another outboard of said girder for holding the pivotal arms and the side girders in the trailing position while being towed and for transmitting substantially all towing forces directly to the hindmost arms and the wheels outboard of the pivotal connection of said arms to the longitudinal girder.

2. A freight car as claimed in claim 1 characterized in that the transverse beam is provided with locking means.

3. A freight car as claimed in claim 1 or 2 characterized in that the wheel suspension is arranged near a pivotal arm on the side girder and the transverse beam supports said pivotal arm.

4. A freight car as claimed in claims 1 and 2 characterized in that the central longitudinal girder is provided with a drawbar pivotally connected therewith by a hinge and the distance between the hinge and the point of connection between the foremost pivotal arm and said central girder is at the most equal to the length of said pivotal arms.

5. A freight car as claimed in claim 1 or 2 characterized in that the pivotal shafts of the pivotal arms are vertically directed, whilst the wheels are set inwardly or outwardly out of track.

6. A freight car as claimed in claim 1 or 2 characterized in that the longitudinal girder is telescopic, the telescopic part being provided at its free end with a transverse support, and lights supported by said transverse support.

7. A freight car as claimed in claim 6 characterized in that the transverse support is provided with hinges between the lights and the longitudinal girder.

8. A freight car as defined in claim 3 wherein said central longitudinal girder is provided with a drawbar pivotally connected therewith by a hinge and the distance between the hinge and the point of connection between the foremost pivotal arm and said central girder is at the most equal to the length of said pivotal arms.

9. A freight car as defined in claim 3 wherein the pivotal shafts of the pivotal arms are vertically directed and the wheels are set inwardly or outwardly of track.

10. A freight car as defined in claim 4 wherein the pivotal shafts of the pivotal arms are vertically directed and the wheels are set inwardly or outwardly of track.

11. A trailer assembly comprising the combination of a centrally located and longitudinally extending main frame having a towing connection at its forward end, a load carrying body supported by said main frame, a pair of load supporting wheels, pivotal parallelogram linkage means pivotally connected to each side of said main frame for respectively positioning said pair of wheels between a wide stance, load transporting position and a narrow stance, trailer transporting position, and transverse frame means rigidly fixed to said main frame and projecting laterally therefrom and disposed adjacent the rear of said linkage means for directly supporting said parallelogram linkage means outboard of said main frame when said wheels are in said wide stance, load transporting position, said transverse frame means and said linkage having interengaging means directly engaging one another outboard of said main frame for holding the linkage in wide stance position while being towed and for transmitting substantially all towing forces directly to the linkage and the wheels outboard of the pivotal connection of said linkage to the main frame so as to reduce forces acting on pivotal connections of said pivotal parallelogram linkage means when the wheels are in the wide stance, load transporting position.

12. A trailer assembly as defined in claim 11 wherein said transverse frame means is located rearwardly of said parallelogram linkage means so as to prevent unintended movement of the wheels from the wide stance position to the narrow stance position when the trailer is moved forwardly.

13. A trailer assembly as defined in claim 11 wherein said parallelogram linkage means is in leading relation to said transverse frame means when said wheels are in said narrow stance position.

14. A trailer assembly comprising the combination of a centrally located and longitudinally extending main frame having a forward end provided with a towing connection, a pair of load supporting wheels, pivotal parallelogram linkage means on each side of said main frame for respectively positioning said pair of wheels between a stance, load transporting position and a narrow stance, trailer transporting position, said parallelogram linkage means comprising a first pair of arms pivotally connected at one end to said main frame respectively at spaced positions on one side of the main frame and a second pair of arms pivotally connected to said main frame respectively at positions corresponding to said spaced positions but at the opposite side of said main frame, a first beam pivotally connected to said first pair of arms in generally parallel relation to said main frame and a second beam pivotally connected to said second pair of arms in generally parallel relation to said main frame, said wheels being carried by said beams at locations adjacent the pivotal connections of one arm of each pair to a respective beam, and transverse frame means rigidly fixed to said main frame and projecting laterally therefrom rearwardly of said pivotal parallelogram linkage means and adjacent thereto for directly supporting said one arm of each pair of arms outboard of said main frame when said wheels are in said side stance, load transporting position, said transverse frame means and said linkage having interengaging means directly engaging one another outboard of said main frame for holding the linkage in wide stance position while being towed and for transmitting substantially all towing forces directly to the linkage and the wheels outboard of the pivotal connection of said linkage to the main frame so as to reduce forces acting on pivotal connections of said pivotal parallelogram linkage means when the wheels are in the wide stance, load transporting position.

15. A trailer assembly as defined in claim 14 including releasable locking means cooperating between said lateral frame means and said one arms for locking said pivotal parallelogram linkage means in the wide stance position of said wheels.

16. A trailer assembly comprising the combination of a centrally located and longitudinally extending main frame having a forward end provided with a towing connection, a pair of load supporting wheels, pivotal parallelogram linkage means on each side of said main frame for respectively positioning said pair of wheels between a wide stance, load transporting position and a narrow stance, trailer transporting position, said parallelogram linkage means comprising a first pair of arms pivotally connected at one end to said main frame respectively at spaced positions on one side of the main frame and a second pair of arms pivotally connected to said main frame respectively at positions corresponding to said spaced positions but at the opposite side of said main frame, a first beam pivotally connected to said first pair of arms in generally parallel relation to said main frame and a second beam pivotally connected to said second pair of arms in generally parallel relation to said main frame, said wheels being carried by said beams at locations adjacent the pivotal connections of one arm of each pair to a respective beam, transverse frame means fixed to said main frame and projecting laterally therefrom rearwardly of said pivotal parallelogram linkage means for overlying and directly supporting said one arm of each pair of arms outboard of said main frame when said wheels are in said wide stance, load transporting position so as to reduce forces acting on pivotal connections of said pivotal parallelogram linkage means when the wheels are in the wide stance, load transporting position, and resilient means for allowing limited vertical movements of said one arms at their pivotal connections to said main frame, and spring means interposed between said lateral frame means and said one arms outboard of said resilient means.

17. A trailer assembly as defined in claim 16 including releasable locking means cooperating between said lateral frame means and said one arms for locking said pivotal parallelogram linkage means in a wide stance position of said wheels.

* * * * *